(12) United States Patent
Lee et al.

(10) Patent No.: US 10,517,160 B2
(45) Date of Patent: Dec. 24, 2019

(54) METHOD AND APPARATUS FOR CONTROLLING LIGHTING

(71) Applicant: Samsung Electronics Co., Ltd., Suwon-si, Gyeonggi-do (KR)

(72) Inventors: Gyeyoung Lee, Seoul (KR); Daedong Kim, Seongnam-si (KR); Dusan Baek, Seoul (KR); Changhyun Lee, Suwon-si (KR); Jaeho Jung, Yongin-si (KR); Yangwook Kim, Hwaseong-si (KR); Haein Chun, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 546 days.

(21) Appl. No.: 14/475,891

(22) Filed: Sep. 3, 2014

(65) Prior Publication Data

US 2015/0061545 A1 Mar. 5, 2015

Related U.S. Application Data

(60) Provisional application No. 61/975,287, filed on Apr. 4, 2014.

(30) Foreign Application Priority Data

| Sep. 5, 2013 | (KR) | 10-2013-0106576 |
| Dec. 17, 2013 | (KR) | 10-2013-0157543 |
| Aug. 29, 2014 | (KR) | 10-2014-0113773 |

(51) Int. Cl.
*H05B 37/02* (2006.01)
*H05B 33/08* (2006.01)

(52) U.S. Cl.
CPC ..... *H05B 37/0272* (2013.01); *H05B 37/0236* (2013.01); *H05B 37/0281* (2013.01); *H05B 33/0854* (2013.01)

(58) Field of Classification Search
CPC ............ H05B 33/0845; H05B 37/0227; H05B 33/0803; H05B 33/0815; H05B 33/0854;
(Continued)

(56) References Cited

U.S. PATENT DOCUMENTS

| 4,947,302 A * | 8/1990 | Callahan | .............. H05B 37/029 315/312 |
| 8,988,432 B2 * | 3/2015 | Mathe | ..................... G06F 3/017 345/426 |

(Continued)

FOREIGN PATENT DOCUMENTS

| CN | 101384122 A | 3/2009 |
| CN | 201536358 U | 7/2010 |

(Continued)

OTHER PUBLICATIONS

ION, Lighting Control Console Operations Manual, Jul. 2009, Electronic Theatre Controls, Inc., Part No. 4310M1210-1.7.0 Re A, XP-002766730.*

(Continued)

*Primary Examiner* — Douglas W Owens
*Assistant Examiner* — Amy X Yang
(74) *Attorney, Agent, or Firm* — Jefferson IP Law, LLP

(57) ABSTRACT

A lighting control method and an electronic device using the same are provided. The method includes receiving pattern information for controlling lighting, generating lighting control information including brightness level information corresponding to operation time information based on the received pattern information, and transmitting the lighting control information.

22 Claims, 18 Drawing Sheets

(58) Field of Classification Search
CPC ............ H05B 37/0218; H05B 37/0272; H05B 37/0281; H05B 37/0236; H05B 37/029; Y02B 20/346; Y02B 20/44; Y02B 20/46; Y02B 20/42
USPC .................................. 315/291, 152, 307, 308
See application file for complete search history.

(56) References Cited

U.S. PATENT DOCUMENTS

| | | | | |
|---|---|---|---|---|
| 2007/0291483 | A1* | 12/2007 | Lys .......................... | A01M 1/04 362/227 |
| 2010/0090613 | A1* | 4/2010 | Spartano ................. | F21L 4/027 315/287 |
| 2011/0135317 | A1 | 6/2011 | Chaplin | |
| 2012/0025717 | A1* | 2/2012 | Klusmann .......... | H05B 37/0218 315/152 |
| 2012/0049765 | A1* | 3/2012 | Lu ........................... | F21S 6/001 315/312 |
| 2013/0141009 | A1 | 6/2013 | Jin et al. | |
| 2013/0275174 | A1* | 10/2013 | Bennett .................. | G06Q 50/08 705/7.23 |
| 2015/0061545 | A1* | 3/2015 | Lee ..................... | H05B 37/0272 315/307 |

FOREIGN PATENT DOCUMENTS

| | | |
|---|---|---|
| CN | 102388678 A | 3/2012 |
| CN | 202253088 U | 5/2012 |
| CN | 202998588 U | 6/2013 |
| CN | 103281846 A | 9/2013 |
| WO | 2012099391 A2 | 7/2012 |
| WO | 2012099432 A2 | 7/2012 |
| WO | WO 2012099391 A2 * | 7/2012 ................. F21S 8/00 |

OTHER PUBLICATIONS

Chinese Office Action dated Aug. 2, 2019, issued in Chinese Application No. 201811120414.2.

* cited by examiner

FIG. 9

```
{
    "pattern":{
        "id": "pattern1",
        "playtime": 40,
        "control": [
            {
                "dimming":10
            },
            {
                "dimming":90
                "transittime":10
            },
            {
                "dimming":10
                "transittime":10
            },
            {
                "dimming":10
                "transittime":10
            },
            {
                "dimming":90
                "transittime":10
            }
        ]
    }
}
```

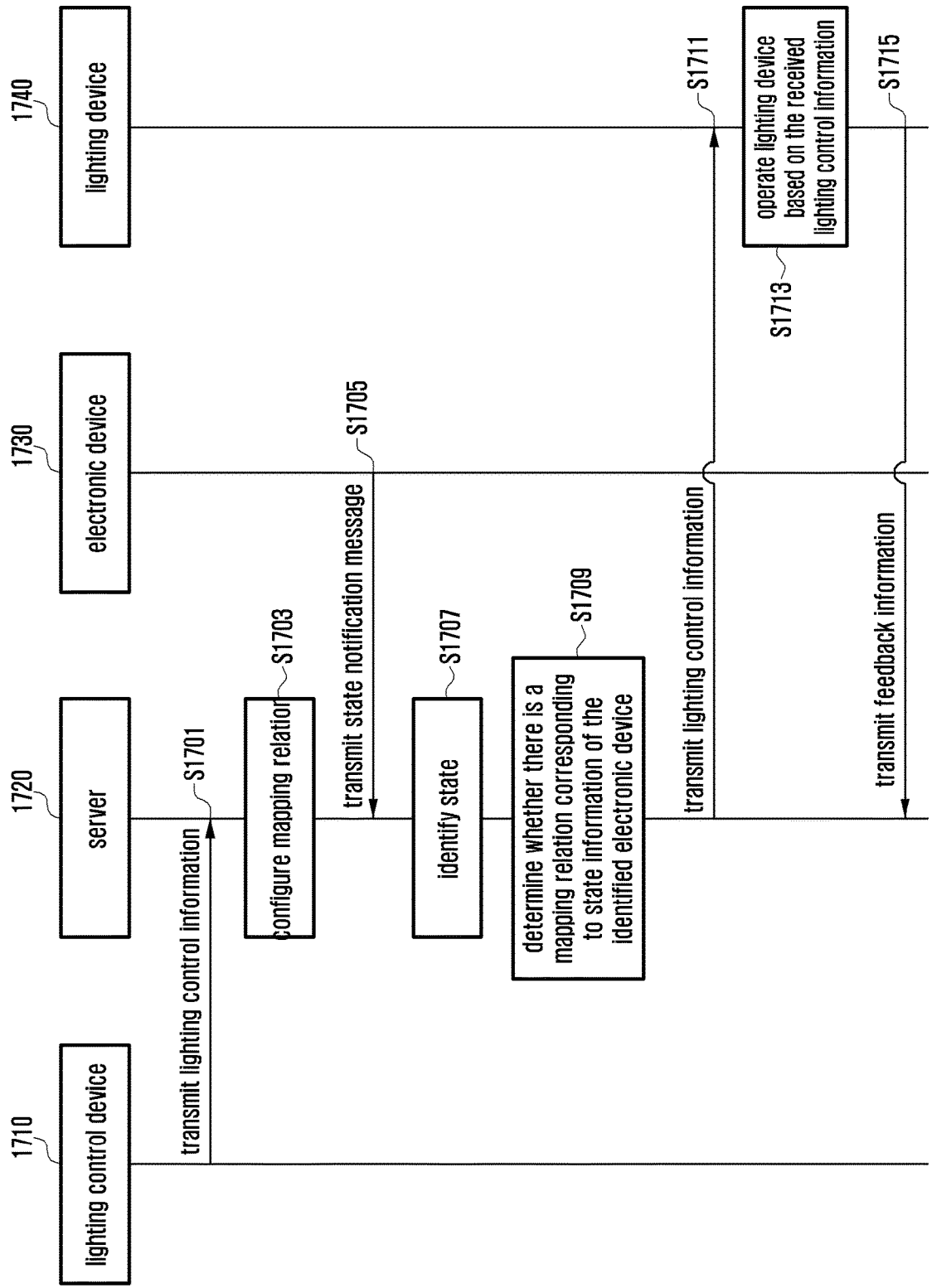

FIG. 18

| electronic device | state | lighting control information | lighting device |
|---|---|---|---|
| washing machine | state 1 | control information 1 | light 1 |
| | state 2 | control information 2 | light 2 |
| | state 3 | control information 3 | light 3 |
| refrigerator | state 4 | control information 4 | light 4 |
| | state 5 | control information 5 | light 5 |
| ⋮ | ⋮ | ⋮ | ⋮ |

METHOD AND APPARATUS FOR CONTROLLING LIGHTING

CROSS-REFERENCE TO RELATED APPLICATION(S)

This application claims the benefit under 35 U.S.C. § 119(e) of a U.S. provisional patent application filed on Apr. 4, 2014 in the U.S. Patent and Trademark Office and assigned Ser. No. 61/975,287, and under 35 U.S.C. § 119(a) of Korean patent applications filed on Sep. 5, 2013, Dec. 17, 2013, and Aug. 29, 2014 in the Korean Intellectual Property Office and assigned Serial numbers 10-2013-0106576, 10-2013-0157543, and 10-2014-0113773, the entire disclosure of each of which is hereby incorporated by reference.

TECHNICAL FIELD

The present disclosure relates to a method and an apparatus for controlling lighting. More particularly, the present disclosure relates to a method and an apparatus for controlling lighting by using a dimming pattern.

BACKGROUND

A lighting device is a device which lightens a dark place to allow human's sight to recognize objects and a Light Emitting Diode (LED), a fluorescent light, an incandescent light, and the like, are mainly used as the lighting device. In general, in the lighting device, each light is individually connected to a switching unit and controlled to be turned on/off or a plurality of lights are connected through one wire and controlled to be turned on/off.

However, with recent technological advancements, research on technologies for controlling color temperature is actively in progress in relation to the development of an LED lighting device which is an eco-friendly material, the development of technologies for controlling lighting, and research and learning effects of a dimming technique for controlling brightness of a light. In addition, research on a technology for automatically controlling lighting devices in an entire building and a digital control technology for controlling lighting in the building in real time which are linked with a smart home system is in progress.

Such a development has resulted in the development of a lighting control system which can differently control a lighting environment according to a lighting use environment by a user as well as a technology for controlling the lighting device in consideration of the user convenience. For example, a technology for individually controlling lighting of a plurality of lights, a technology for controlling dimming by configuring brightness of a plurality of lights with a certain level, and a technology for controlling color temperature or the color of lights according to a user environment by the user are being researched.

Therefore, a need exists for a method and an apparatus for controlling lighting by using a dimming pattern.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an improved lighting control method and apparatus.

An embodiment of the present disclosure provides a method of configuring a dimming pattern of a lighting device corresponding to a lifestyle pattern, such as waking up or going to bed or making a pattern to deliver information through an interworking with a multimedia function, and a method and an apparatus for controlling and managing the lighting device.

In accordance with an aspect of the present disclosure, a method of controlling lighting using an electronic device is provided. The method includes receiving pattern information for controlling lighting, generating lighting control information including brightness level information corresponding to operation time information based on the received pattern information, and transmitting the lighting control information.

In accordance with another aspect of the present disclosure, an electronic device controlling lighting is provided. The electronic device includes a communication unit configured to transmit/receive data for controlling lighting, and a lighting controller configured to control to receive pattern information for controlling lighting, to generate lighting control information including brightness level information corresponding to operation time information based on the received pattern information, and to transmit the lighting control information.

In accordance with another aspect of the present disclosure, a method of controlling lighting linked with an electronic device is provided. The method includes configuring mapping information of one or more electronic devices, state information of the electronic devices, and lighting devices corresponding to the state information, receiving a state notification message from the one or more electronic devices, identifying state information of the electronic device based on the state notification message, and transmitting lighting control information selected based on the identified state information and the mapping information to a lighting device corresponding to the identified state information.

In accordance with another aspect of the present disclosure, an apparatus of a server controlling lighting through a link with an electronic device is provided. The apparatus includes a communication unit configured to communicate with one or more lighting devices and electronic devices, and a controller configured to control to configure mapping information of one or more electronic devices, state information of the electronic devices, and lighting devices corresponding to the state information, to receive a state notification message from the one or more electronic devices, to identify state information of the electronic device based on the state notification message, and to transmit lighting control information selected based on the identified state information and the mapping information to a lighting device corresponding to the identified state information.

In accordance with another aspect of the present disclosure, it is possible to provide a method and an apparatus in which a user can efficiently control and manage a lighting device.

In accordance with another aspect of the present disclosure, the user can easily configure various patterns to control lighting. Further, the user convenience can increase through an interworking with a smart home system.

In accordance with another aspect of the present disclosure, lighting control information may be generated using sound information and lighting may be intuitively controlled using the sound information.

In accordance with another aspect of the present disclosure, various patterns can be easily made and used for the purpose of a scheduling function (e.g., waking up, going to bed, and the like), an information notification (e.g., a call, a Short Messaging Service (SMS), a home appliance operation notification, and the like) and the like based on various situations.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 9 is a view illustrating a protocol corresponding to lighting control information according to an embodiment of the present disclosure;

FIG. 17 illustrates a method of connecting and controlling a home appliance and a lighting device according to an embodiment of the present disclosure; and FIG. 18 illustrates a mapping relation according to an embodiment of the present disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Figure 1:
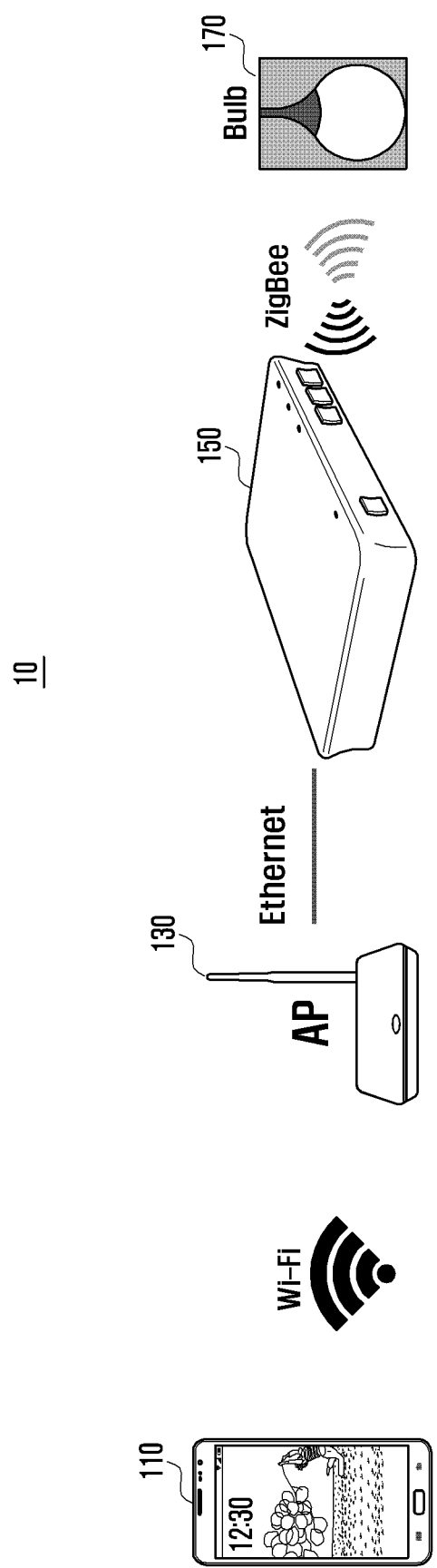
FIG. 1 is a diagram illustrating a lighting control system according to an embodiment of the present disclosure.

FIG. 1 is a diagram illustrating a lighting control system according to an embodiment of the present disclosure.

Referring to FIG. 1, a lighting control system 10 may include a lighting control device 110 for transmitting a lighting control command to a lighting device 170 and the light device 170 for supplying a lighting light. Further, the lighting control system 10 may further include bridges 130 and 150 which interwork through an Internet Protocol (IP) network between the lighting control device 110 and the lighting device 170.

The lighting control device 110 may include an electronic terminal, such as a smart phone, a portable terminal, a mobile terminal, a Personal Digital Assistant (PDA), a Portable Multimedia Player (PMP) terminal, a note pad, a Wibro terminal, a tablet Personal Computer (PC), and the like. Further, the lighting control device 110 may be a home appliance, such as a refrigerator, a Television (TV), or a washing machine which support wireless communication.

Hereinafter, a smart phone will be described as an example of the lighting control device in an embodiment of the present disclosure.

The lighting control device and the lighting device may be connected through wireless communication. The wireless communication may include a short-range wireless communication scheme. The short-range wireless communication scheme may include Bluetooth, Zigbee, Wireless-Fidelity (Wi-Fi), Android beam, Worldwide interoperability for Microwave Access (WiMax), Wireless Local Area Network (WLAN), infrared communication, and the like.

The lighting control device 110 and the lighting device 170 may be connected through a direct wireless communication method. When the lighting control device 110 and the lighting device 170 directly communicate with each other, the lighting control system 10 may be configured using the lighting control device 110 and the lighting device 170 without the bridges. Further, the lighting control system 10 may include one or more bridges. When the lighting control system 10 includes the bridge, the lighting control device 110 and the lighting device 170 may communicate through the bridge. The communication includes a wireless communication scheme and the wireless communication scheme may include a short-range wireless communication scheme.

Each of the bridges 130 and 150 may support the same type of communication system or the different types of communication system. For example, referring to FIG. 1, the lighting control device 110 and the bridge 130 may be connected using Wi-Fi communication and the bridge 150 and the lighting device 170 may be connected using Zigbee communication. Each of the bridges 130 and 150 may be connected through Ethernet or may be directly connected through a wired scheme. The connection scheme is an example of connecting the lighting control device 110 and the light device 170 which use different communication schemes, but the connection scheme of the present disclosure is not limited thereto.

Further, when the smart home system is used and when the home appliance connected to the bridge changes, the lighting control system 10 may be configured to operate the lighting device 170 according to a configuration of the wireless lighting control device 110. In the smart home system, the bridges 130 and 150 may operate as a server of the smart home system. Further, a separate server for executing the smart home system may exist independently from the bridge. For example, the server may receive lighting control information from the lighting control device 110, store the received lighting control information, and map the lighting control information with the lighting device 170. The server may store a mapping relation between the home appliance and the lighting device 170. Further, the server may store a mapping relation between one or more states of the home appliance and the lighting device 170. The lighting control information may be additionally mapped.

When a state of the home appliance changes, the server may receive a state notification message from the home appliance. The server may determine that state of the home appliance based on the received state notification message. The server may transmit lighting control information corresponding to information on the identified state of the home appliance to the mapped lighting device. The lighting device may receive the lighting control information and operate based on the received lighting control information. The user may receive a notification of the state of the mapped home appliance based on the operation of the lighting device 170.

The lighting control device 110 may serve as the server. At this time, the lighting control device may connect the home appliance and the lighting device, receive state information of the home appliance, and transmit corresponding lighting control information to the lighting device.

Figure 2:
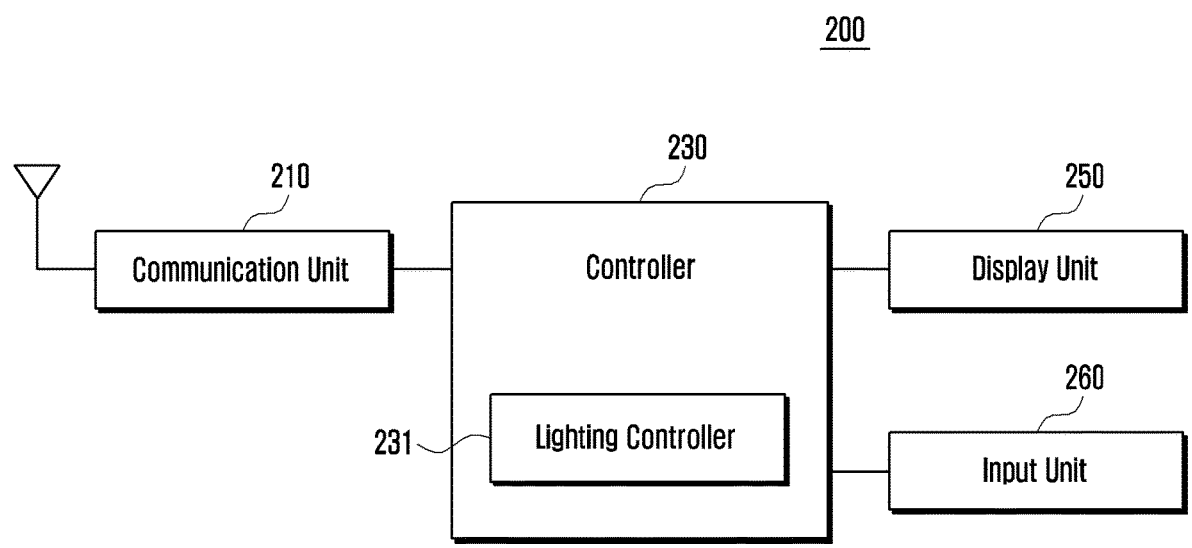
FIG. 2 is a block diagram illustrating a lighting control device according to an embodiment of the present disclosure.

FIG. 2 is a block diagram illustrating a lighting control device according to an embodiment of the present disclosure.

Referring to FIG. 2, a lighting control device 200 may include a communication unit 210, a controller 230, and a display unit 250.

The communication unit 210 may perform data communication through a wireless connection with a neighboring network node. The communication unit 210 may transmit/receive data for controlling the network node (for example, a WLAN Access Point (AP), the bridge, and the like) and the lighting device. The communication unit 210 may perform a short-range communication function and may be connected to the network node through the short-range communication.

The controller 230 may control general operations of the lighting control device. The controller may further include a lighting controller 231.

According to an embodiment of the present disclosure, the lighting controller 231 may be configured to control to receive lighting control pattern information, to determine an operation switching point corresponding to the received lighting control pattern information, to generate lighting control information by using coordinate information of the determined operation switching point, and to transit the generated lighting control information.

Further, according to an embodiment of the present disclosure, the lighting controller 231 may be configured to control to receive pattern information for controlling lighting, to generate lighting control information including brightness level information corresponding to operation time information based on the received pattern information, and to transmit the lighting control information.

In addition, the lighting controller 231 may be configured to control to generate a two dimensional input area configured with a lighting operation time and a lighting brightness level and receive the pattern information in the generated input area. When the lighting controller 231 receives pattern information on a plurality of brightness levels at the same time point, the lighting controller 231 may control to output error information.

Further, the lighting controller 231 may be configured to control to determine an operation switching point based on slope information of the pattern information and generate lighting control information based on a time difference between operation switching points and a brightness level difference. In addition, the lighting controller 231 may be configured to control to sample the pattern information in the unit of set time and to generate lighting control information based on time information and a brightness level at each of the sampled points.

The lighting controller 231 may be configured to control to generate lighting control information on the on/off operation time based on time when the input area is touched.

The lighting controller 231 may be configured to control to generate lighting control information based on the existence or non-existence of sound information. When the sound information is input, the lighting controller 231 may be configured to control to identify a sound input within a set sound size range as an input signal for controlling the lighting in order to distinguish the sound information from noise.

Further, the lighting controller 231 may be configured to control to identify set sound type information. The sound type information indicates on/off of lighting, control of a dimming level, and the like. The lighting controller 231 may be configured to control to generate lighting control information based on the identified sound type information. Further, the lighting controller 231 may be configured to identify size or frequency information of the sound information and control a dimming level based on the identification.

According to an embodiment of the present disclosure, the pattern information includes sound information and the lighting controller 231 may be configured to control the lighting control information based on the sound information. The lighting controller 231 may be configured to control to identify sound type information for identifying the sound information, to determine whether set sound type information is included in the sound information, and to generate the lighting control information based on input interval information of the sound type information included in the sound information.

Further, the lighting controller 231 may be configured to control to generate lighting control information based on a text input.

Functions and operations of the lighting controller 231 have been described. However, the operations and the functions of the lighting controller 231 are not limited thereto and it is apparent that the lighting controller 231 performs operations according to various embodiments of the present disclosure described through FIGS. 4 to 18 below.

The display unit 250 may output user data which is output by the controller 230. According to an embodiment of the present disclosure, the display unit 250 may display a state of the lighting device, display a control state of the lighting device, and display an input area for receiving a lighting control command. Further, the display unit 250 may display a control pattern by a control of the controller.

An input unit 260 may receive a control command for general controls of the lighting control device 200. According to an embodiment of the present disclosure, pattern information for controlling the lighting device may be received through the input unit. When the display unit 250 is used as a touch screen, the display unit 250 may be used as the input unit 260.

Meanwhile, the lighting control device 200 has been described by divided blocks. However, the divided blocks are for the convenience of description, and the scope of the present disclosure is not limited thereto.

Figure 3:
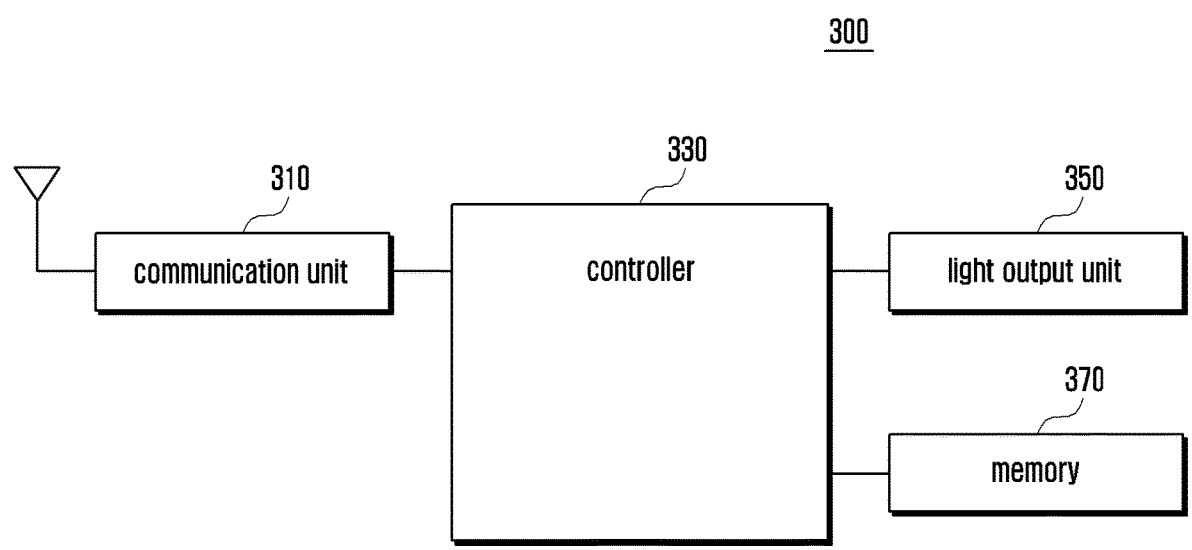
FIG. 3 is a block diagram illustrating a lighting device according to an embodiment of the present disclosure.

FIG. 3 is a block diagram illustrating a lighting device according to an embodiment of the present disclosure.

Referring to FIG. 3, a lighting device 300 includes a communication unit 310, a controller 330, a light output unit 350, and a memory 370.

The communication unit 310 may perform data communication with a neighboring network node. The communication unit 310 may include a communication module for performing short-range communication. The lighting device 300 may form a network with the lighting control device through a short-range communication network of the communication unit 310 and transmit/receive data. The communication unit 310 may communicate with the lighting control device through a bridge.

The controller 330 may control general operations of the lighting device 300. The controller 330 may control the lighting device according to an embodiment of the present disclosure. At this time, the controller 330 may communicate with the lighting control device by controlling a lighting communication unit 310. For example, the controller 330 may be configured to control to receive dimming control information and operation time control information from the lighting control device. Further, the controller 330 may be configured to control to perform a flickering operation by controlling the light output unit 350 based on the received dimming control information and operation time control information.

The light output unit 350 generates light. At this time, the light output unit 350 may output light by performing the flickering operation. The light output unit 350 may output light during an output time interval and then may repeat an operation of blocking light without outputting the light during a blocking time interval. For example, the light output unit 350 may include a plurality of Light Emitting Diodes (LEDs) as a light source. However, the LED is an embodiment of the light source and the light source is not limited to the LED.

The memory 370 may be configured by a program memory and data memories. The program memory may store programs for controlling the general operation of the lighting device 300. At this time, the program memory may store programs for performing the lighting control operation according to an embodiment of the present disclosure. The data memory may store data generated during the execution of programs.

Meanwhile, the lighting device 300 has been described by divided blocks. However, the divided blocks are for the convenience of the description, and the scope of the present disclosure is not limited thereto.

Figure 4:
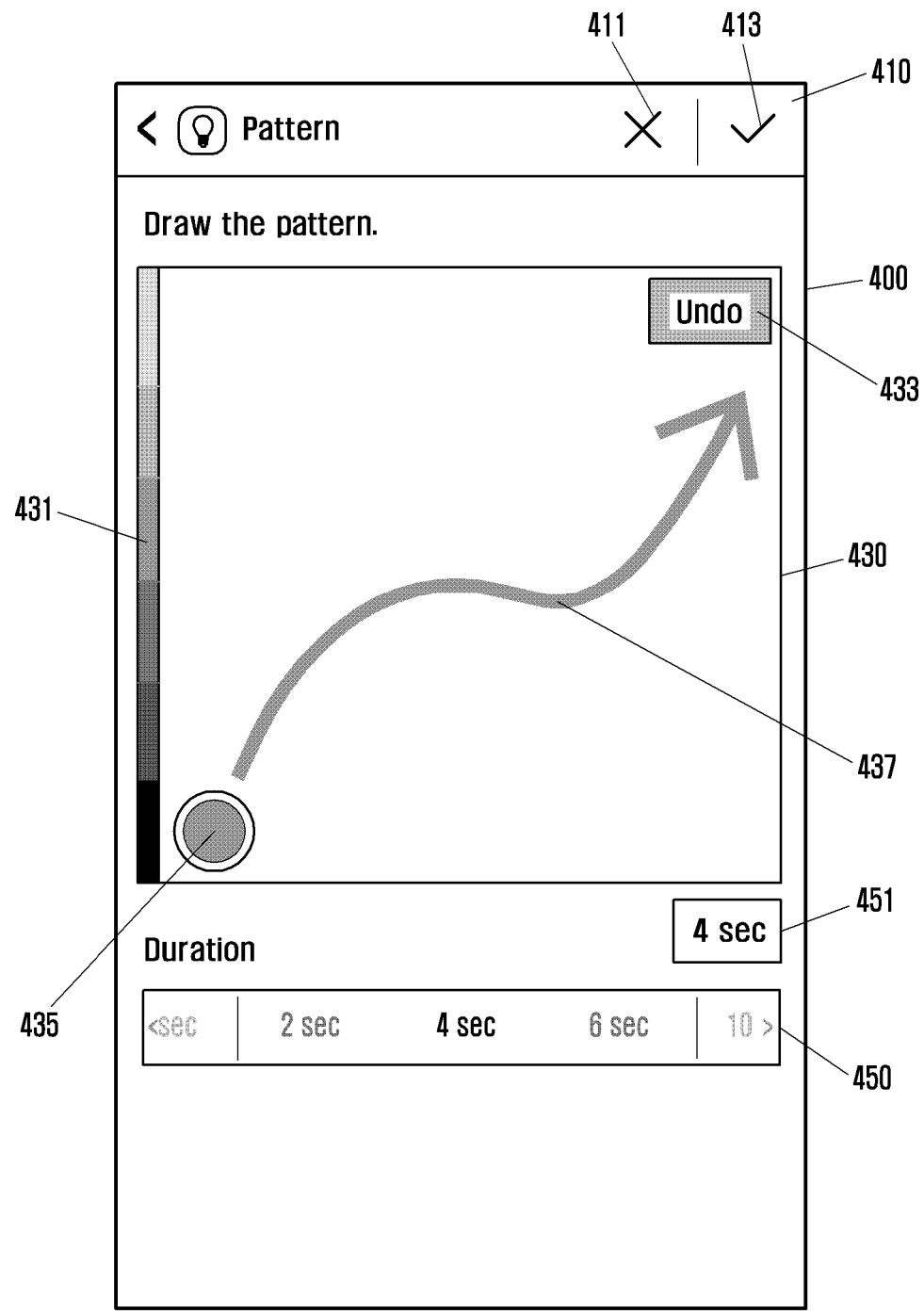
FIG. 4 is a view illustrating a lighting control information input screen according to an embodiment of the present disclosure.

FIG. 4 is a view illustrating a lighting control information input screen according to an embodiment of the present disclosure.

Referring to FIG. 4, a configuration of a display unit 400 for receiving lighting control information according to an embodiment of the present disclosure is illustrated. In FIG. 4, the display unit 400 may perform a function of displaying an application for controlling lighting and also serve as an input unit for receiving lighting control information. Hereinafter, it is assumed that a screen of the display unit 400 is in one state of the application for controlling the lighting device.

The screen of the application for controlling the light device based on pattern information may include a mode display area 410, a pattern input area 430, and a period configuration area 450.

The mode display area 410 is a mode for illustrating a current input mode of the application. For example, the lighting control device may execute various modes to control the lighting device and the mode display area is an area in which attributes of the mode used for the control by a current user among one or more modes. For example, a current situation in which the phrase "pattern" is displayed in the mode display area 410 describes that mode attributes of the lighting control application is a mode for configuring the lighting control by the pattern input. A page configuration cancel area 411 is an area for inputting a user control command for cancelling a configuration of control information based on pattern information configured in the pattern input area 430. The configuration information on the pattern information input into the pattern input area 430 may be reset or canceled according to a control command of the user. Further, a page configuration completion area 413 is an area for inputting a user control command for completing a configuration of control information based on pattern information configured in the pattern input area 430. Accordingly, the configuration information on the pattern information input into the pattern input area 430 may be stored according to a control command of the user.

The pattern input area 430 may receive pattern information from the user. The pattern information may be converted to lighting control information for the lighting control and transmitted to the lighting device to be controlled. For example, the pattern input area 430 may be displayed as a two dimensional pattern input area 430 having an x axis and a y axis. According to an embodiment of FIG. 4, the x axis of the pattern input area 430 is a time area corresponding to the operation time of the lighting device. For example, an x axis value corresponds to the operation time and a ratio of a current x axis value to an entire x axis length may correspond to the current operation time with respect to the total time. A time value corresponding to an entire length of the x axis may be configured as a basic value or configured by a time value corresponding to a period selected in the period configuration area 450. For example, when 4 sec is selected in the current period configuration area 450, a total period of the x axis may be configured as 4 sec. At this time, the configured period may be displayed as indicated by a reference numeral 451 or may be displayed to be distinguished from other selection elements within the period configuration area 450. With respect to the configured total x axis length, a left end of the x axis may be configured as a start point and a right end may be configured as an end point of the time axis. Configurations of the x axis and a configuration method of the x axis do not limit the scope of present disclosure thereto.

A y axis 431 corresponds to a dimming level area corresponding to dimming of the lighting device. For example, a ratio of a current y axis value to a total y axis length may be a current dimming level with respect to 100% of a dimming level. As illustrated in FIG. 4, dimming level information may be displayed. The dimming level information may be expressed by explicit numbers or may be expressed by color temperature corresponding to a dimming level to intuitively show the dimming level as illustrated in FIG. 4. When the y axis is not explicitly displayed, a lowest part of the y axis may be configured as a dimming level 0 and a highest part of the y axis may be configured as a dimming level 100 according to a basic setting. Configurations of the y axis and a configuration method of the y axis do not limit the scope of present disclosure thereto. Dimming may be used as a similar meaning to brightness of lighting.

According to an embodiment of the present disclosure, a dimming level and an operation time of the lighting device may be determined according to an input of the pattern information 437 for the pattern input area 430 by the user. The dimming level and the operation time may operate in real time to correspond to each other or a dimming level corresponding to a point of a pattern 435 may operate in every set time period. For example, based on the input of the pattern information 437 described in FIG. 4, it may be analyzed that a pattern of totally increasing the dimming level is input according to the lapse of time. The pattern information may be pattern information including points or lines. For example, in FIG. 4, although the pattern information is input by connected lines, the pattern information may be input by points or disconnected lines. When the pattern information is input by points or disconnected lines, lighting control information may be analyzed by sequentially connecting disconnected patterns according to sequences on the time axis. For example, according to an embodiment of the present disclosure, it is possible to control lighting by generated customized lighting control information based on the user's need.

Meanwhile, when there are points having the same x axis value in lighting control pattern inputs, it indicates that two control commands are input at the same time. Accordingly, when inputs having the same x axis value are made, several messages may be displayed for the user. Further, since the pattern input area 430 has a max value and a min value of the x axis, if a current x coordinate goes beyond a range of Min<x coordinate<Max, an error message may be displayed. However, when the current x coordinate goes beyond the input available x coordinate range, the error message may not be generated. In addition, the value beyond the range may not be used for generating control information and pattern information within the pattern input area 430 may be used for generating the control information. Similarly, when a y axis pattern goes beyond the pattern input area 430 range, the error message may be generated or the control information may be generated using pattern information within the pattern input area 430 except for the value beyond the range.

The pattern input area 430 may include a cancel command input area 433. When a control command is input into the cancel command input area 433 after the input of the pattern information 437, the generated pattern information 437 may be deleted.

Figure 5:
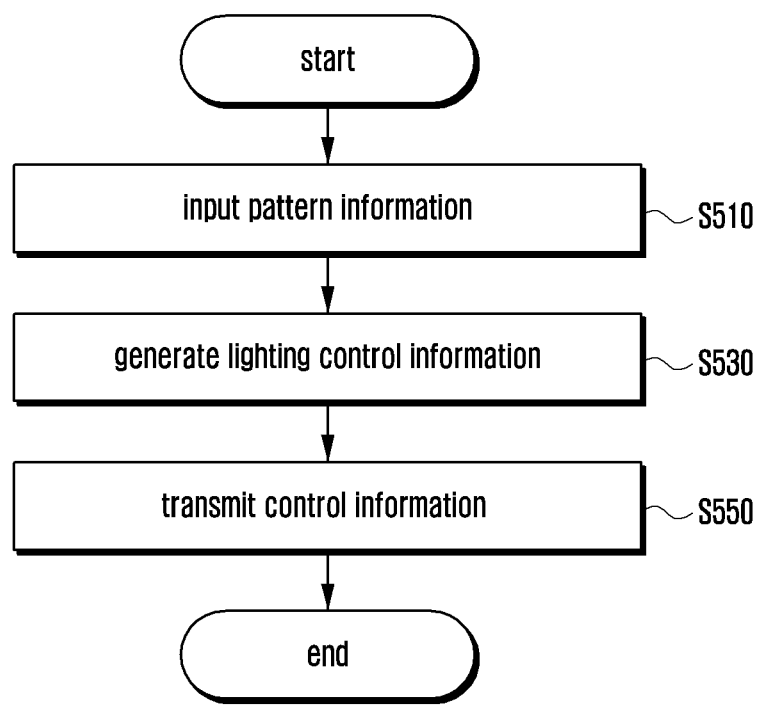
FIG. 5 is a flowchart illustrating a lighting control method according to an embodiment of the present disclosure.

FIG. 5 is a flowchart illustrating a lighting control method according to an embodiment of the present disclosure.

Meanwhile, a lighting control method described below may be performed by the controller of the lighting control device or the lighting controller.

Referring to FIG. 5, a lighting control application may be first executed to control lighting. Thereafter, in operation S510, pattern information for controlling lighting may be input into the lighting control device. The pattern information may include design patterns. For example, the pattern information may be image information including lines or points.

In operation S530, the lighting control device may generate lighting control information. The lighting control information may be control information transmitted to control lighting. The lighting control information may be formed based on the input pattern information. The lighting control information may be control information of a dimming level corresponding to each piece of time information. Further, the lighting control information may be control information based on each dimming level corresponding to each time point corresponding to a set time configuration period.

In operation S550, the lighting control device may transmit the generated lighting control information. The lighting control information may be directly transmitted to a light from the lighting control device. Further, the lighting control information may be transmitted to the light via a wireless AP or a bridge.

Figure 6:
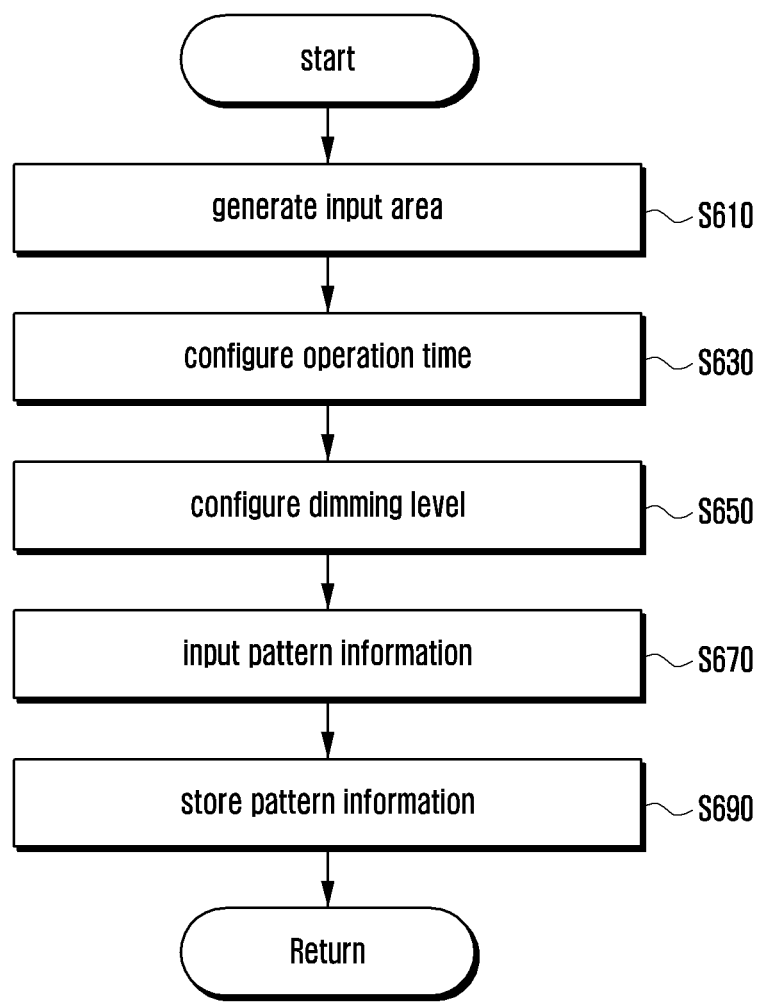
FIG. 6 is a flowchart illustrating a method of inputting pattern information according to an embodiment of the present disclosure.

FIG. 6 is a flowchart illustrating a method of inputting pattern information according to an embodiment of the present disclosure.

Referring to FIG. 6, when a lighting control application is first executed to control lighting, a lighting pattern information configuration page may be output. An input area for inputting lighting pattern information may be generated in the configuration page in operation S610. Meanwhile, although an embodiment of FIG. 6 describes that the input area is first generated, the corresponding input area may be generated after an operation time and a dimming level are configured. When the input area is first formed, the input area may be generated according to a set default value. When there is a later change in the configuration of the operation time or the dimming level or there is an input of the change, attributes of the operation time and the dimming level of the input area may be changed to corresponding values.

In operation S630, the operation time of the lighting device may be configured to the lighting control device. The operation of configuring the operation time may be performed before the operation of generating the input area or after the operation of configuring the dimming level. Further, the operation of configuring the operation time may not be necessary. The operation time may use a set value. When the input area is pre-generated, attribute information of the operation time of the input area may be changed or re-configured in accordance with the set operation time. When the input area is not generated, an input area corresponding to a next operation time may be generated.

In operation S650, the dimming level of the lighting device may be configured to the lighting control device. Similar to the operation of configuring the operation time, the operation of configuring the dimming level may be performed before the operation of generating the input area or after the operation of configuring the operation time. Further, the operation of configuring the dimming level may use a basic value. For example, when a y axis of the input area is used as a reference of the dimming level, a ratio of a current y axis value to a total y axis length may be a current dimming level with respect to 100% of a dimming level. When the basic value is used by default, the operation of configuring the dimming level may be omitted. When the dimming level is configured, a highest dimming level or a lowest dimming level may be controlled according to a user's request. The generation of the input area according to the configuration of the lighting operation time is an embodiment of the present disclosure, but the present disclosure is not limited thereto.

According to operations S610 to S630, the input area in which the dimming level and the operation time are configured may be generated. Hereinafter, it is assumed that the input area corresponds to a two dimensional area having an x axis corresponding to the operation time and a y axis corresponding to the dimming level. Configurations of the x axis and the y axis may vary depending on the user's intention.

In operation S670, pattern information may be input. Lighting control information may be generated based on the pattern information. The pattern information may be input into the generated input area. The pattern information may be pattern information including points or lines. Further, the pattern information may be input through a touch input. For example, the pattern information which makes lighting turned on during a touch time in a touch input mode and makes lighting turned off during a non-touch time may be input. When the information is input through a touch time, lighting control information corresponding to an intuitive time which the user desires may be generated.

In operation S690, when the pattern information is configured, pattern information input by the user may be stored.

Meanwhile, a method of inputting new pattern information has been described above. However, at least one piece of pattern information may be stored in a storage unit of the lighting control device. When the user generates new pattern information, the pattern information may be stored in the storage unit of the lighting control device. Further, when the user loads a pattern stored in the storage unit, the stored pattern may be changed and stored through the above described process.

Basically, the lighting control device may generate lighting control information corresponding to the operation time and the dimming level of the input pattern information. In this case, lighting control information on the dimming level corresponding to each operation time may be generated. Meanwhile, when lighting control information on the dimming level corresponding to the operation time is generated in real time, overloads may be generated in the lighting control device and the lighting device. Accordingly, the lighting control information may be generated using an operation switching point, an inflection point, time sampling, and the like. Hereinafter, a method of generating lighting control information using the above described method will be described.

The method of generating the lighting control information according to an embodiment of the present disclosure will be described with reference to FIGS. 7, 8, 9, 10, and 11.

Figure 7:
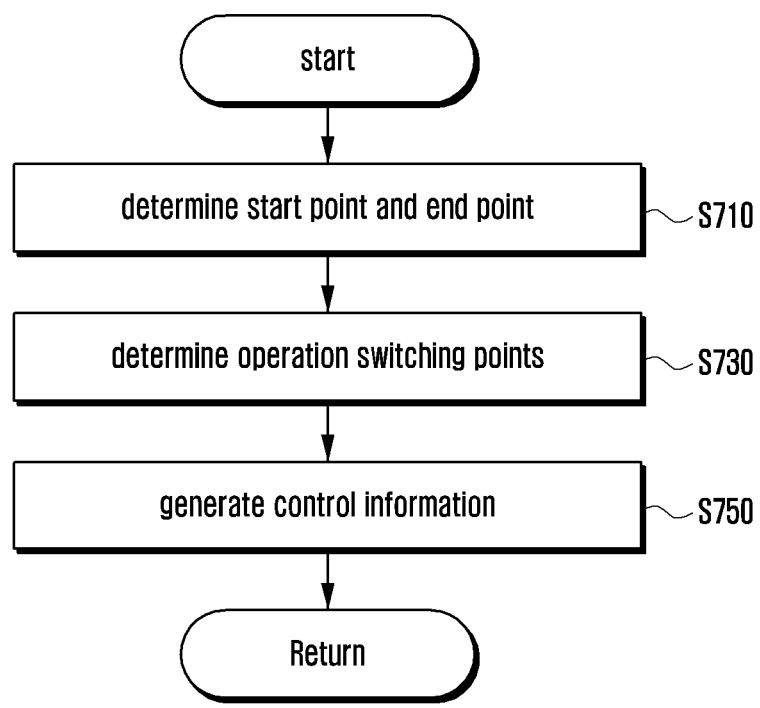
FIG. 7 is a flowchart illustrating a method of generating lighting control information according to an embodiment of the present disclosure.
Figure 8:
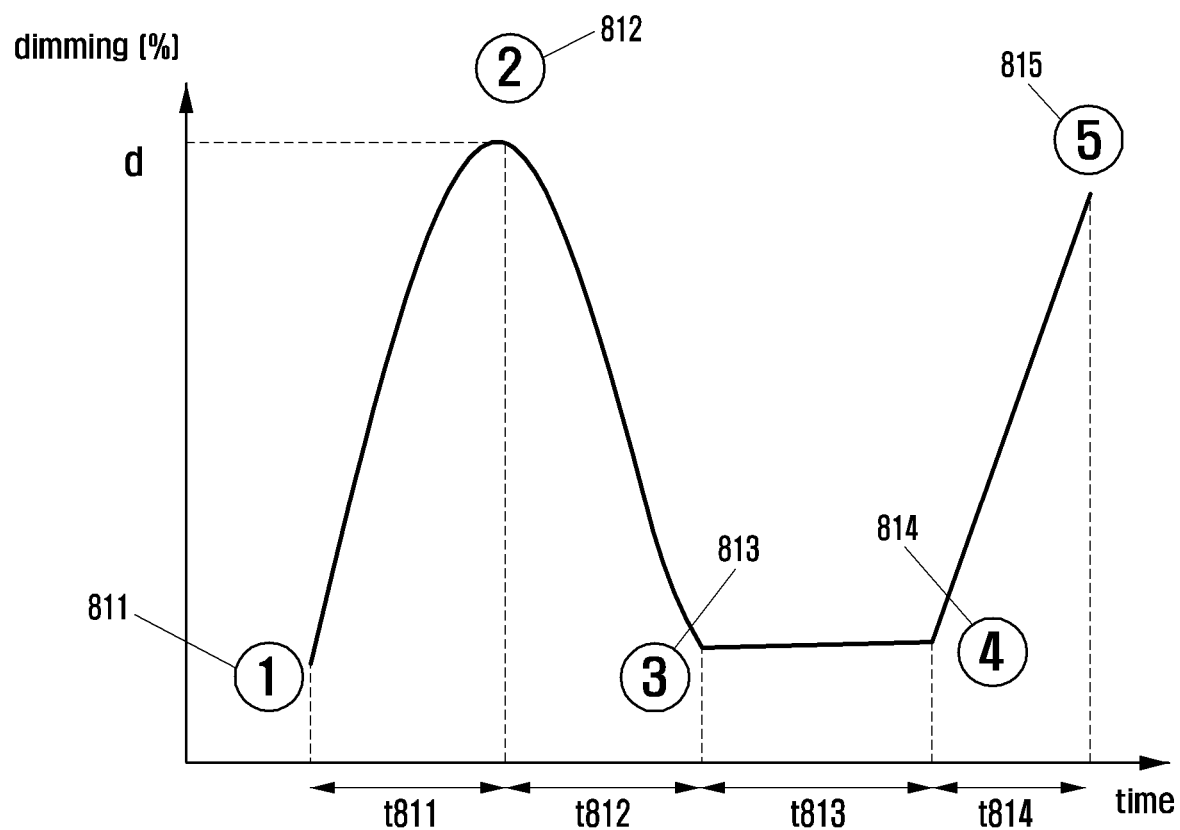
FIG. 8 is a graph illustrating a method of determining operation switching points when lighting control information is generated according to an embodiment of the present disclosure.
Figure 10:
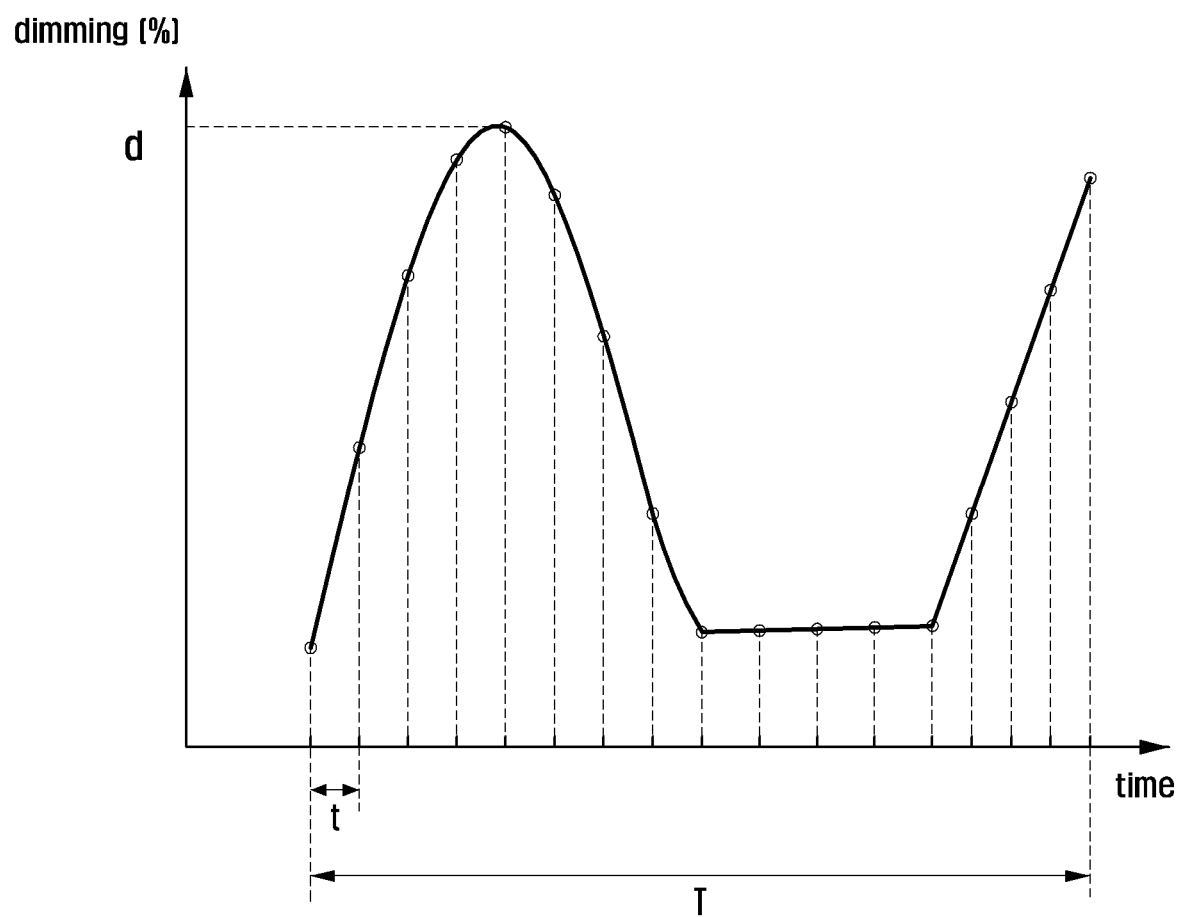
FIG. 10 is a graph illustrating a time sampling method according to an embodiment of the present disclosure.
Figure 11:
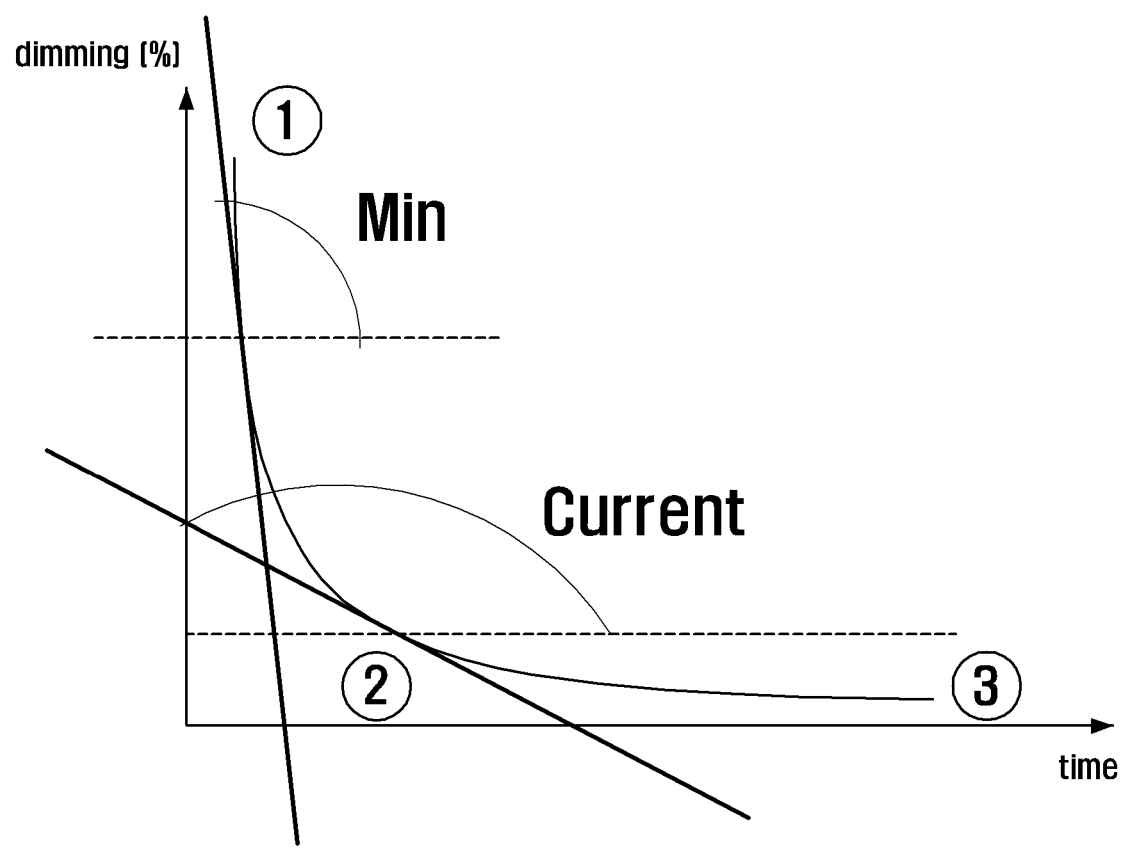
FIG. 11 is a graph illustrating a method of determining operation switching points according to an embodiment of the present disclosure.

FIG. 7 is a flowchart for illustrating a method of generating lighting control information according to an embodiment of the present disclosure, FIG. 8 is a graph illustrating a method of determining an operation switching point when lighting control information is generated according to an embodiment of the present disclosure, FIG. 9 is a view illustrating a protocol corresponding to lighting control information according to an embodiment of the present disclosure, FIG. 10 is a graph illustrating a time sampling method according to an embodiment of the present disclosure, and FIG. 11 is a graph illustrating a method of determining an operation switching point according to an embodiment of the present disclosure.

Hereinafter, it is assumed that the input pattern information is pattern information including lines.

Referring to FIG. 7, in operation S710, the lighting control device may determine a start point and an end point of the input pattern information. In the pattern information including lines, a pattern part corresponding to a lowest level on a time axis may be the start point and a pattern part corresponding to a highest level on the time axis may be the end point. Referring to FIG. 8, a part indicated by a reference numeral 811 of FIG. 8 may be extracted as the start point and a part indicated by a reference numeral 815 of FIG. 8 may be determined as the end point.

In operation S730, the lighting control device may determine an operation switching point. The operation switching point may be a point where a slope attribute of the pattern information is changed or there is a change greater than a set slope or more. Further, the operation switching point may include the start point and the end point. For example, the slope attributes may include a position where the slope of the pattern information is changed from a positive value to a negative value or from a negative value to a positive value. Further, the slope attributes may include a position where the slope value is changed from a positive value or a negative value to 0 or changed from 0 to a positive value or a negative value. Moreover, a discontinuous position in the slope of the pattern information may be determined as the operation switching point. In addition, when a change in the slope is greater than or equal to a set change, the position may be determined as the operation switching point.

Further, in operation S750, the lighting control device may generate control information.

Referring to FIG. 8, parts indicated by reference numerals 812, 813, and 814 may be determined as the operation switching points. Since the reference numeral 812 corresponds to a part where the slope value is changed from a positive value to 0, the part may be determined as the operation switching point. Since the reference numeral 813 corresponds to a part where the slope value is changed from a negative value to 0, a part where a change in the slope is discontinuous, or a part where there is a change in the slope greater than or equal to a set reference value, the part may be determined as the operation switching point. Further, since the reference numeral 814 is a part where a change in the slope is discontinuous or a part where there is a change in the slope greater than or equal to a set reference value, the part may be determined as the operation switching point.

When the operation switching point is determined, an operation interval may be determined. For example, in FIG. 8, an interval between a start point 811 and a first operation switching point 812 may be determined as a first operation interval t811, an interval between the first operation switching point 812 and a second operation switching point 813 may be determined as a second operation interval t812, an interval between the second operation switching point 813 and a third operation switching point 814 may be determined as a third operation interval t813, and an interval between the third operation switching point 814 and an end point 815 may be determined as a fourth operation interval t814. The first operation interval t811 is an operation interval where a dimming level increases according to the elapse of time and the second operation interval t812 is an operation interval where a dimming level decreases according the elapse of time. The third operation interval t813 is an operation interval where a dimming level is constant according to the elapse of time and the fourth operation interval t814 is an operation interval where a dimming level increases according the elapse of time.

When the operation switching point is determined, lighting control information may be generated using information on the start point, the end point, and the operation switching points. The lighting control information may be generated using coordinates of the determined start point, end point, and the operation switching points. The lighting control information may be determined for each of the operation intervals.

A value of the start point on the x axis may be an offset of the operation time and a value of the start point on the y axis may be a dimming control value. A difference between the values on the x axis based on the start point, the end point, and the operation switching points may be determined as the operation time of each operation interval. Further, a difference between the values on the y axis in operation intervals may be determined as a dimming level change in the operation interval. A ratio of the difference between the operation switching points on the x axis (total operation time*(t operation interval length/x axis length) may be configured as the operation time of each operation interval. A y axis value of each operation switching point may be configured as a dimming value (100*(d/y axis length)). With respect to each operation interval, the lighting control device may generate lighting control information to change a dimming value having the same ratio between the start point and the end point of the operation interval, from a start dimming value to an end dimming value of the operation interval.

The lighting control information may include lighting control pattern information and lighting control command protocol information. The lighting control device may generate a command protocol as shown in FIG. 9 by using a start point, an end point, operation switching points, offset time, operation intervals, and a dimming control value.

Referring to FIG. 9, id refers to pattern identification information. The pattern identification information may be a name of a pattern for identifying pattern information. In an embodiment of FIG. 9, "pattern 1" may be a name of a pattern. "Playtime" is a length of the total operation time corresponding to pattern information. In the embodiment of FIG. 9, the total operation time of the pattern is 40 sec (when the time unit is sec). The following description will be made with reference to FIGS. 8 and 9 together. In FIG. 8, a dimming level of the start point 811 of the first operation interval t811 is 10, a dimming level of the end point 812 of the first operation interval t811 is 90, and a length of the operation interval is 10 sec. Based on control information of the first operation interval, it starts at dimming level 10 and reaches dimming level 90 within 10 seconds. Since the start point 812 of the second operation interval t812 corresponds to the end point 812 of the first operation interval t811, a dimming level of the start point 812 of the second operation interval t812 is 90, a dimming level of the end point 813 of the second operation interval t812 is 10, and a length of the operation interval is 10 sec. Based on control information of the second operation interval, it starts at dimming level 90 and reaches dimming level 10 within 10 seconds. Through such a method, the lighting control information corresponding to the pattern information may be generated.

Another method of generating lighting control information may include a time sampling method.

Referring to FIG. 10, total operation intervals may be sampled at a set time interval t with respect to the total operation time T. In an embodiment of FIG. 10, the total operation time T is sampled into sixteen intervals. The lighting control device may extract dimming information corresponding to each sampling position. The lighting control device may generate lighting control information including dimming information on a sampling time point by using the extracted information.

Another method of generating lighting control information may include a method of determining an operation switching point by using an inflection point.

Referring to FIG. 11, when a pattern input is initially received, a slope may be calculated using coordinates of a previous point and a current point. When a difference between angles of the slopes is greater than or equal to a set threshold, the part may be determined as the operation switching point. A slope at each time point is continuously calculated from the start point or the operation switching point. A current slope is compared with a maximum value of a minimum value of a set slope. When the current slope is greater than a ratio value giving the weight to the set minimum value, the position having the current slope may be determined as the operation switching point. For example, if the current slope>a*Min(1<a<2), the position having the current slope may be determined as the operation switching point. For example, when a is 1.5, a position having a slope 1.5 times greater than a slope at a particular time point may be determined as the operation switching point. Further, when the current slope is less than a ratio value giving the weight to the set maximum value, the position having the current slope may be determined as the operation switching point. For example, if the current slope<b*Max(0<b<1), the position having the current slope may be determined as the operation switching point. For example, when b is 0.5, a position having a slope 0.5 times greater than a slope at a particular time point may be determined as the operation switching point. When the operation switching point is determined, the method of generating lighting control information based on the determined operation switching point is similar to that described in FIGS. 7 and 8.

The lighting control device may control the lighting device by transmitting the lighting control information generated through the above described method to the lighting device. The lighting control device may directly transmit the lighting control information to the lighting device. Further, the lighting control device may transmit the generated control information through a bridge or a wireless AP without directly transmitting the control information to the lighting device. The bridge having received the lighting control information may transmit the received information to the lighting device. The bridge may store the received lighting control information. The lighting device may operate in accordance with the received lighting control information.

The lighting control device may additionally receive a command of making a request for the lighting control information. The lighting control information may include information making a request for a lighting control pattern list. When the lighting control information request message is received, the light control device may show the stored lighting control information or load and show a pattern list corresponding to each piece of the lighting control information. In this case, the lighting control device may show lighting control information stored in the bridge as well as the lighting control information stored in the lighting control device itself.

The lighting control device may display at least one piece of lighting control information or a pattern corresponding to the lighting control information. Further, a pattern image and an operation time corresponding to each pattern may be displayed. When at least one of a plurality of pieces of lighting control information is selected, a pattern image and an operation time corresponding to the selected lighting control information may be shown.

Additionally, the user may modify the stored pattern information. For example, when the user modifies a total operation time, an x axis ratio value of each operation switching point may be re-calculated and modified lighting control information may be stored. The modified information may be stored in the lighting control device. Further, the modified information may be stored in the bridge.

Thereafter, a method of inputting lighting control information according to another embodiment of the present disclosure will be described. According to another embodiment of the present disclosure, a method of inputting lighting control information using sound information or a method of inputting lighting control information based on a text may be suggested.

The lighting control method using the sound information will be first described. The sound information may include user voice information or signals input from other sound sources.

Hereinafter, voice information corresponding to an example of the sound information will be described in an embodiment of the present disclosure.

Figure 12:
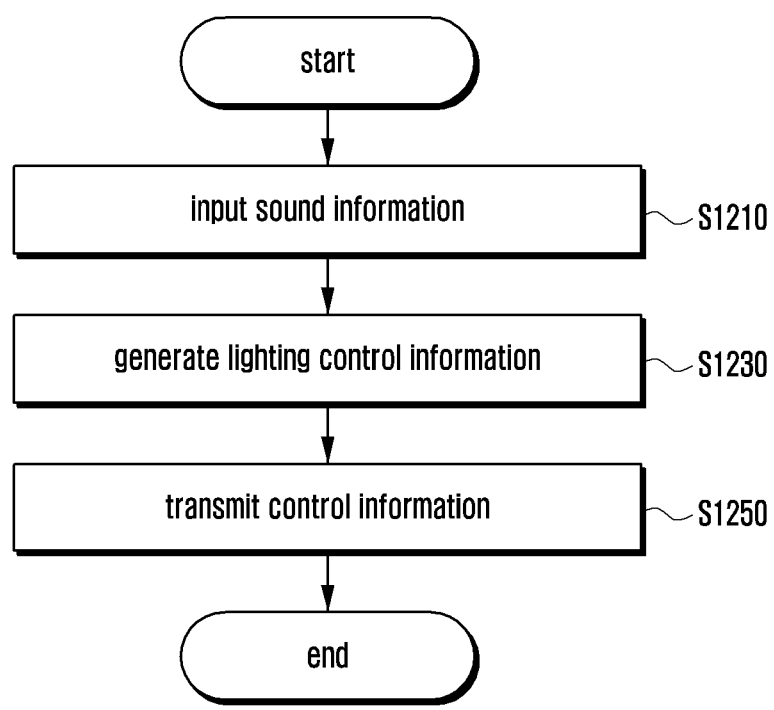
FIG. 12 is a flowchart illustrating a lighting control method according to an embodiment of the present disclosure.

FIG. 12 is a flowchart illustrating a lighting control method according to an embodiment of the present disclosure.

Referring to FIG. 12, a lighting control application may be first executed to control lighting. Thereafter, in operation S1210, sound information for controlling lighting may be input into the lighting control device. The sound information may be user voice information or signals input from other sound sources.

In operation S1230, the lighting control device may generate lighting control information. The lighting control information may be control information transmitted to control lighting. The lighting control information may be formed based on the input voice information. The lighting control information may generate lighting on/off control information, dimming control information, an on/off period, the number of times of on/off and the like based on the input voice information.

In operation S1250, the lighting control device may transmit the generated lighting control information. The lighting control information may be directly transmitted to a light from the lighting control device. Further, the lighting control information may be transmitted to the light via a wireless AP or a bridge.

Figure 13:
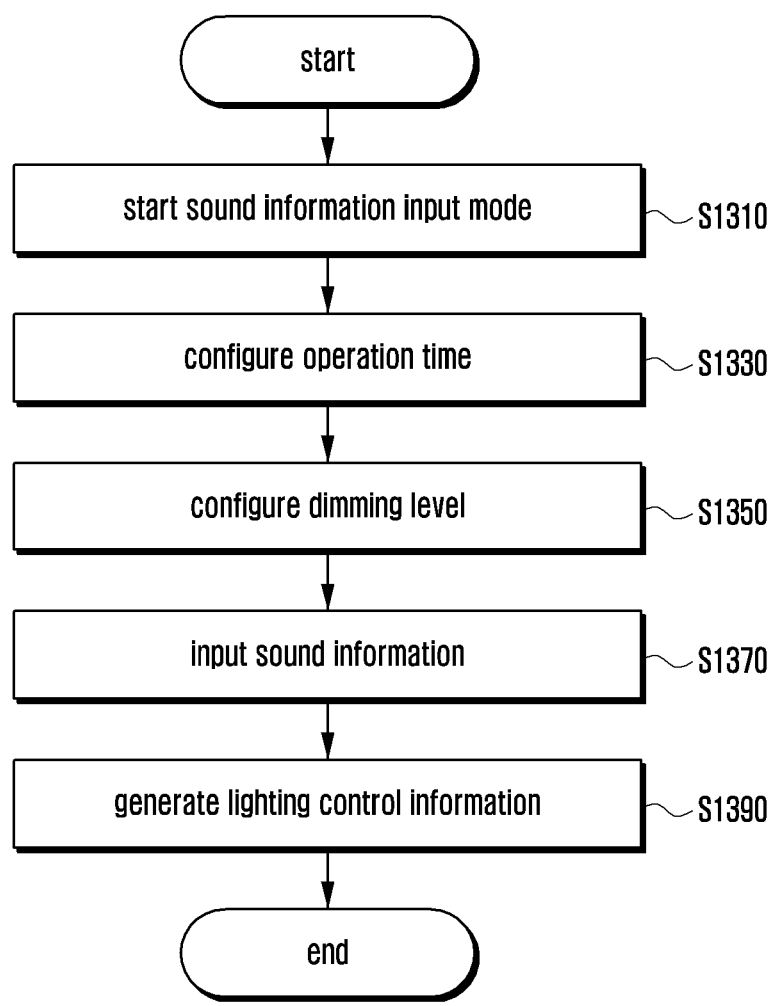
FIG. 13 is a flowchart illustrating a method of inputting voice information according to an embodiment of the present disclosure.

FIG. 13 is a flowchart illustrating a method of inputting voice information according to an embodiment of the present disclosure.

Referring to FIG. 13, when a lighting control application is first executed to control lighting, a sound information input mode may be executed. The lighting control device may turn on a sound recognition module for receiving sound information in the sound information input mode. The sound recognition module may be included in the lighting controller of the lighting control device. Accordingly, the lighting controller may perform a function of the sound recognition module, that is, the lighting controller may start sound information input mode in operation S1310. Meanwhile, a lighting control information input area may be additionally displayed. In the lighting control information input area, an operation time or a dimming level of lighting may be configured.

In operation S1330, the operation time of the lighting device may be configured in the lighting control device. The operation of configuring the operation time may be performed before the operation of generating the input area or after the operation of configuring the dimming level. Further, the operation of configuring the operation time may not be necessary. The operation time may use a set value. When the input area is pre-generated, attribute information of the operation time of the input area may be changed or re-configured in accordance with the set operation time. When the input area is not generated, an input area corresponding to a next operation time may be generated.

In operation S1350, the dimming level of the lighting device may be configured to the lighting control device. Similar to the operation of configuring the operation time, the operation of configuring the dimming level may be performed before the operation of generating the input area or after the operation of configuring the operation time. Further, the operation of configuring the dimming level may use a basic value. For example, when a y axis of the input area is used as a reference of the dimming level, a ratio of a current y axis value to a total y axis length may be a current dimming level with respect to a dimming level of 100%. When the basic value is used by default, the operation of configuring the dimming level may be omitted. When the dimming level is configured, a highest dimming level or a lowest dimming level may be controlled according to a user's request. The generation of the input area according to the configuration of the lighting operation time is an embodiment of the present disclosure, but the embodiment of the present disclosure is not limited thereto. Meanwhile, the operation of configuring the operation time and the dimming level may be omitted.

In operation S1370, voice information may be input into the lighting control device. The voice information may be detected by the sound recognition module.

In operation S1390, the lighting control device may generate lighting control information based on the voice information input into the lighting control device. The sound information input into the lighting control device and a method of generating the lighting control information will be described with reference to FIG. 14.

When the lighting control information is generated, the lighting control information may be stored in the lighting control device. Meanwhile, the lighting control device may match the generated lighting control information with a particular lighting device. For example, the lighting control device may match the generated lighting control information with a particular lighting device to control the matching lighting device. The lighting device corresponding to the generated lighting control information may be generated before the lighting control information is generated. For example, after the particular lighting device is generated, such a series of processes for selecting the generated lighting device may be performed.

Meanwhile, a method of inputting new voice information has been described above. However, at least one piece of voice information may be stored in a storage unit of the lighting control device. When the user generates new pattern information, the pattern information may be stored in the storage unit of the lighting control device. Further, when the user loads a pattern stored in the storage unit, the stored pattern may be changed and stored through the above described process.

Figure 14:
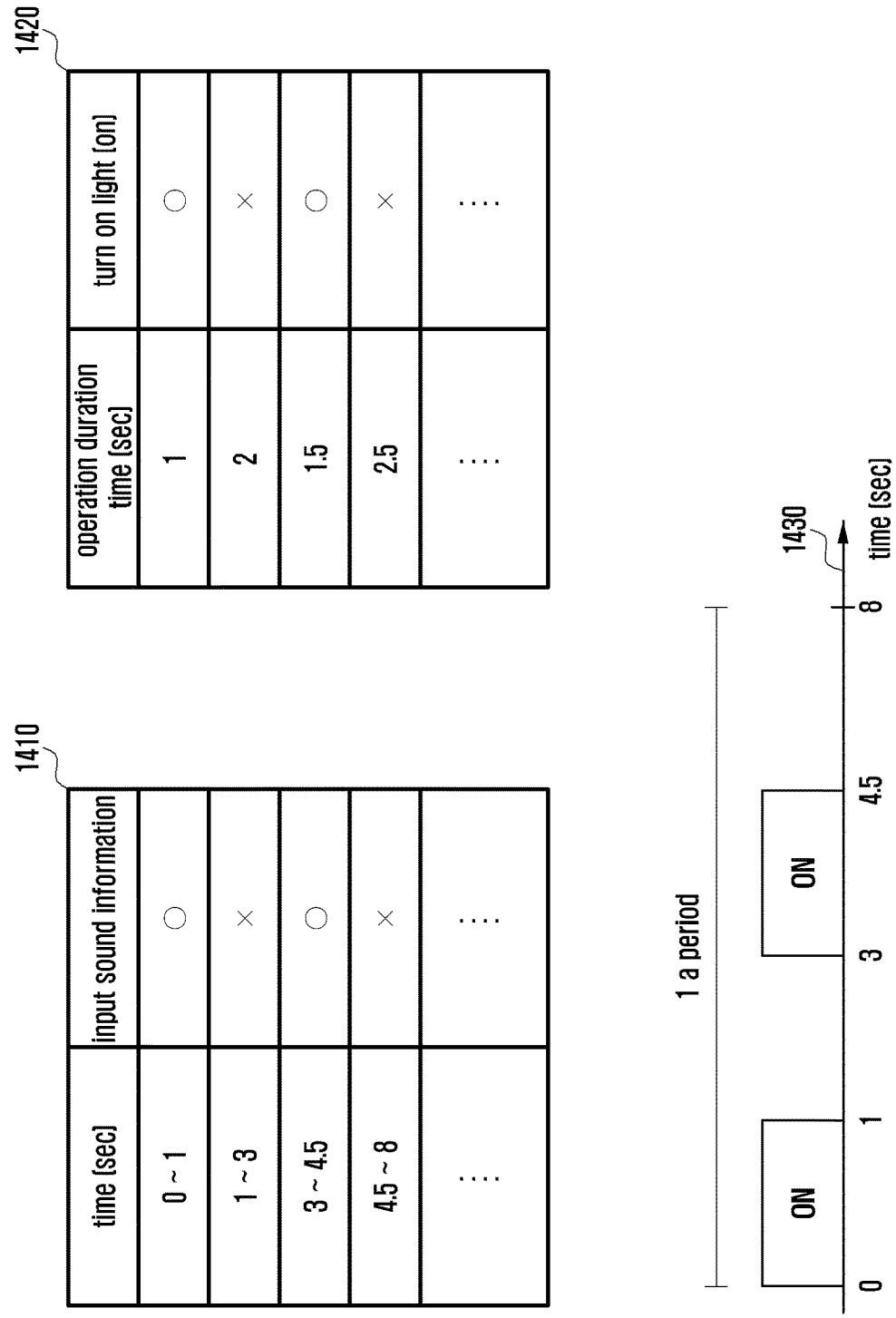
FIG. 14 illustrates a method of inputting sound information and generating lighting control information according to an embodiment of the present disclosure.

FIG. 14 illustrates a method of inputting sound information and generating lighting control information according to an embodiment of the present disclosure.

The lighting control device may first receive sound information. The lighting control device may configure on/off timing of the lighting device based on the received sound information. For example, the lighting control device may configure the on/off timing of the lighting device based on the existence or non-existence of the sound information. The lighting control device may configure a time when the sound information is input as the on timing of the light device and configure a time when the sound information is not input as the off timing of the lighting device.

Referring to FIG. 14, the lighting control device may generate a sound information input table 1410 based on the received sound information. For example, it is assumed that the lighting control device receives sound information during a time interval of 0 to 1 seconds in the sound information input mode, does not receive the sound information during a time interval of 1 to 3 seconds, receives the sound information during a time interval of 3 to 4.5 seconds, and does not receive the sound information during a time interval of 4.5 to 8 seconds.

In this case, the lighting control device may generate information, such as the sound information input table 1410 based on the received sound information. The sound information input table may correspond to lighting control information. Further, the lighting control device may generate lighting control information 1420 having one period based on the sound information input table 1410. The lighting control device may generate the lighting control information 1420 making the light device turned on for 1 second, turned off for next 2 seconds, turned on for next 1.5 seconds, and turned off for next 2.5 seconds. For example, on/off control information of the lighting device may be generated based on the input sound information.

The lighting control information may be lighting control information of one period. For example, the lighting control information 1420 may be control information having a period of 8 seconds. Additionally, the number of times by which operations are performed during the lighting control information may be configured. The number of times by which the operations are performed may be once or more.

When the number of times by which the operations are performed is two times or more, the lighting control information may be generated for the set number of times. For example, the number of times by which the operations are performed is configured as n, a total operation time of the lighting control information may be 8n seconds. Meanwhile, the total operation time may be configured. For example, the total operation time may be the operation time configured in operation S1330. The operation time may be pre-configured or may be generated after the lighting control information of one period is generated. For example, the operation time may be configured as 32 seconds. In this case, the lighting control information 1420 having the period of 8 seconds may be generated to be performed during an operation time of 32 seconds.

Meanwhile, the lighting control information may be generated as pattern information 1430 and the pattern information 1430 may be displayed through the display unit of the lighting control device. The user may intuitively identify the lighting on/off operation according to the lighting control information through the pattern information 1430.

Meanwhile, when sound information for generating the lighting control information is received in the sound input mode, unintended noise may be recognized as voice information for lighting information. Accordingly, the lighting control device may configure a sound information identification threshold. When sound information within a set range is received, the sound information identification threshold may be information for identifying the sound information to control lighting. The threshold may be a threshold having a lowest value or a threshold having both a lowest value and a highest value. The threshold may be a threshold for a size of the sound information and a unit of the sound size may be dB. When sound information having a size which does not meet the threshold range is received, the lighting control device may identify that the sound information is not the control information for the lighting control. Accordingly, even though the sound information is input, the sound information is not recognized as the lighting control information for turning on the lighting device and is ignored. As a result, the sound information for generating the lighting control information may be distinguished from noise. In order to exclude noise, sound type information for controlling lighting may be pre-configured.

Figure 15:
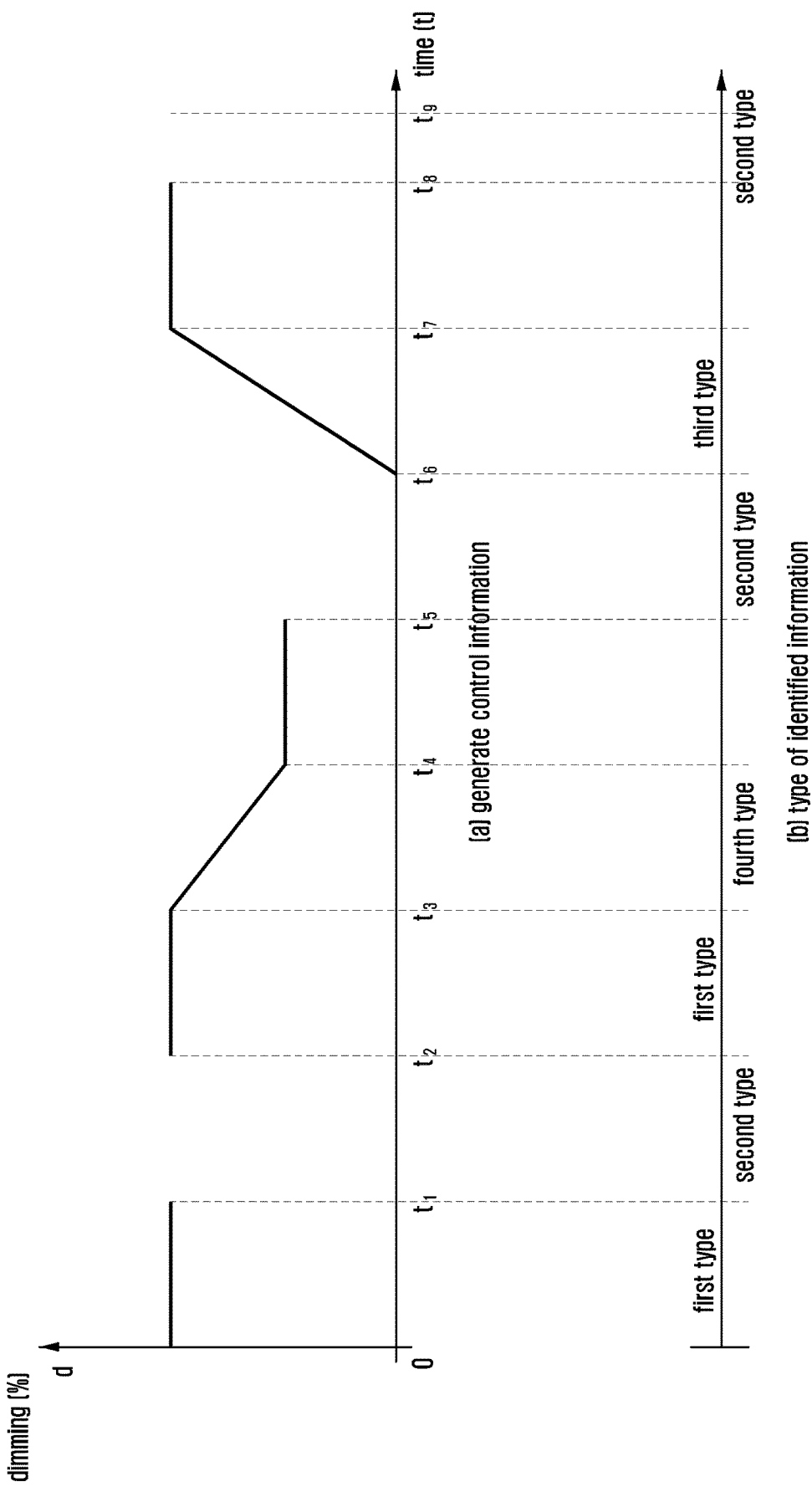
FIG. 15 illustrates a method of generating lighting control information based on sound type information according to an embodiment of the present disclosure.

FIG. 15 illustrates a method of generating lighting control information based on sound type information according to an embodiment of the present disclosure.

Sound type information for controlling operations of the lighting device may be configured in the lighting control device. For example, the sound type information may include sound type information (first type information) for turning on lighting, sound type information (second type information) for turning off lighting, sound type information (third type information) for increasing a dimming level, and sound type information (fourth type information) for decreasing a dimming level. The above listed sound type information is an embodiment of the sound type information and examples of the sound type information are not limited thereto.

Referring to FIG. 15, part (a) of FIG. 15 illustrates an embodiment in which lighting control information is generated. Although lighting control information is expressed as a graph in FIG. 15, the expression is not limited thereto and may be made through a text or another method. Part (b) of FIG. 15 illustrates an identification result of time of input sound type information.

Since first type information is identified during a time interval of 0 to t1, the lighting control device may generate control information for turning on lighting during a time corresponding to the time interval of 0 to t1. When lighting is turned on with respect to the first type information, a dimming level of lighting may be pre-configured. Since second type information is identified during a time interval of t1 to t2, the lighting control device may generate control information for turning off lighting during a time corresponding to the time interval of t1 to t2. Since first type information is identified again during a time interval of t2 to t3, the lighting control device may generate control information for turning on lighting during a time corresponding to the time interval of t2 to t3. Since fourth type information is identified during a time interval of t3 to t4, the lighting control device may generate control information for decreasing a dimming level of lighting during a time corresponding to the time interval of t3 to t4. At this time, a change in the dimming level during a unit time may be pre-configured. Accordingly, the dimming level may be changed based on the change in the dimming level during each unit time and duration of t3 to t4.

During a time interval of t4 to t5, sound information for maintaining the dimming level may be identified. Further, when set sound type information is not identified, the configuration may be made to maintain the dimming level. For example, when separate sound information is not received during the time interval of t4 to t5, the lighting control device may generate control information for maintaining the dimming level of t4 during a time corresponding to the time interval of t4 to t5. Since the second type information is identified during a time interval of t5 to t6, the lighting control device may generate control information for turning off lighting during a time corresponding to the time interval of t5 to t6. Since third type information is identified during a time interval of t6 to t7, the lighting control device may generate control information for increasing a dimming level of lighting during a time corresponding to the time interval of t6 to t7. When separate sound information is not received during a time interval of t7 to t8, the lighting control device may generate control information for maintaining the dimming level of t7 during a time corresponding to the time interval of t7 to t8. Since the second type information is identified during a time interval of t8 to t9, the lighting control device may generate control information for turning off lighting during a time corresponding to the time interval of t8 to t9.

A time length of 0 to t9 may be generated as lighting control pattern information of one period. As illustrated in FIG. 14, lighting may be controlled by the control information of one period or the number of times by which the period is repeated may be additionally configured. Further, the lighting control information may be generated by configuring a total operation time and applying the lighting control pattern information of the configured period during the pre-configured total operation time.

In the above embodiment of the present disclosure, for example, the first type information may be voice information of [ggam] and the second type information may be voice information of [bbak]. For example, it is assumed that voice information of [ggam] [bbak] [ggam] [bbak] is input into the lighting control device. Control information for turning on the lighting device during a time for which an input of [ggam] is identified may be generated and control information for turning off the lighting device during a time for which an input of [bbak] is identified may be generated. For example, the user may input sound information of [ggam] [bbak] into the lighting control device and then intuitive lighting control information may be generated in response to the user's voice input. For example, when the user desires to turn on the lighting device during a particular time and turn off the lighting device during another particular time, the first type information and the second type information may be generated and the lighting control device may receive the first and second type information. Since the user may intuitively determine the operation time of the lighting device in accordance with the duration of the first type information and the second type information, such a method is intuitive and useful to the user.

Meanwhile, although the third type information and the fourth type information have been described, the dimming level may be controlled using the first type information and the second type information. For example, when the second type information is input after the first type information, the light control information may be generated for turning off lighting by gradually decreasing the dimming level. On the contrary, when the first type information is input after the second type information, the light control information may be generated for turning on lighting by gradually decreasing the dimming level.

Further, when sound information is input, the dimming level may be controlled in accordance with information on a size of the sound information. For example, an operation will be described as an example in which lighting control information for turning on lighting when sound information is input and turn off lighting when the sound information is not input. At this time, when a sound size increases during a time for which sound information is input, control information for increasing the dimming level during the corresponding time may be generated. When a sound size decreases during a particular time interval of the time for which sound information is input, control information may be generated for decreasing the dimming level during the corresponding time.

At this time, the dimming level may be determined based on a basic dimming level. For example, a basic dimming level and a highest dimming level may be configured. At this time, lighting control information may be generated by matching a time point when a size of sound information input during a time interval for which the sound information is input is largest with a highest dimming level and matching a time point at which a size of sound information is smallest with a lowest dimming level. Control information may be generated by identifying information on a time point when sound information is input, a time point when largest sound information is input, and a time point when smallest sound information is input and connecting the time points on the continuous time.

Further, in an embodiment of the present disclosure, the dimming level may be controlled based on pitch information. The pitch information may be associated with the frequency of sound information. In physics, as the vibration frequency increases, the pitch becomes higher.

An embodiment of the present disclosure provides a method and an apparatus for controlling lighting based on text information.

Figures 16A, 16B:
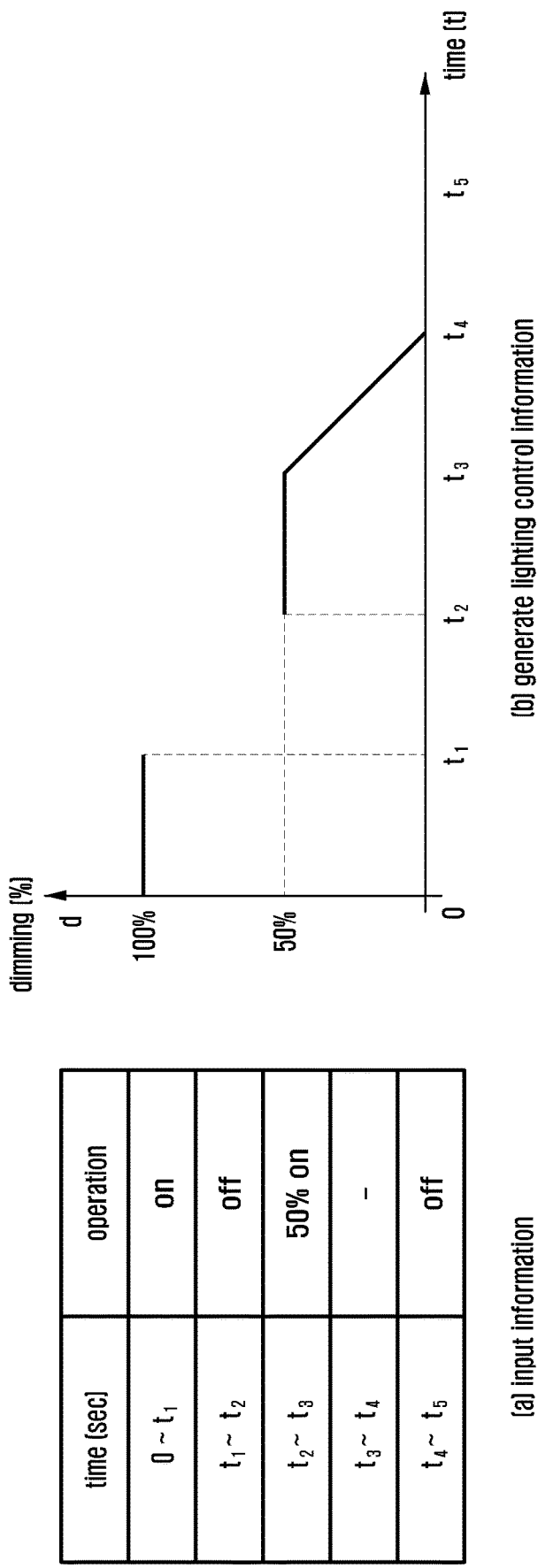
FIGS. 16A and 16B illustrate a method of generating lighting control information based on text information according to an embodiment of the present disclosure.

FIGS. 16A and 16B illustrate a method of generating lighting control information based on text information according to an embodiment of the present disclosure.

Referring to FIG. 16A, information for controlling lighting may be input. The input information may be text information. Information on each time interval and information on an operation in the time interval may be input.

The input information may have the form of input lighting control information having one period of 0 to t5.

Information for turning on lighting is input during a time interval of 0 to t1, information for turning off lighting is input during a time interval of t1 to t2, and information for turning on lighting with a dimming level of 50% is input during a time interval of t2 to t3. Further, direct information is not input during a time interval of t3 to t4 and information for turning off lighting is input during a time interval of t4 to t5. When there is no input of control information between on and off states (for example, the time interval of t3 to t4 in FIG. 16A, lighting control information may be analyzed to gradually control the dimming level therebetween. For example, since the lighting device is in the on state during t3 and in the off state during t4, lighting control information for turning off the lighting device during t4 may be generated by gradually decreasing the dimming level while progressing from t3 to t4.

The input information itself of FIG. 16A may be generated as the control information. Further, the input information may be generated as lighting control information in the form of the graph as illustrated in a graph of FIG. 16B. When the lighting control information in the form of the graph is displayed, it is advantageous to the user in that the user may intuitively identify a lighting operation during the configured period through the graph. Referring to the graph of FIG. 16B, the user may intuitively identify an interval in which lighting is turned on, a dimming level in an on state, and time.

Referring to FIG. 16B, lighting control information may be generated for turning on lighting during a time period of 0 to t1, turning off lighting during a time period of t1 to t2, turning on lighting with a dimming level of 50% during a time period of t2 to t3, decreasing a dimming level during a time period of t3 to t4, and turning off lighting during a time period of t4 to t5.

Thereafter, a method of connecting and controlling a home appliance and a lighting device according to an embodiment of the present disclosure will be described. According to an embodiment of the present disclosure, when a state change of the electronic device is detected, a state notification message may be transmitted to a service through various communication methods. The server may detect the state change. The server having detected the state change may transmit lighting control information for controlling a lighting operation to the lighting device. Each electronic device, lighting control information, and a lighting device may be pre-configured through a mapping relation.

When the light control information or the mapping relation is not configured, the mapping relation may be additionally configured. In an embodiment of the present disclosure, an application for transmitting/receiving a control signal between the lighting control device and the server should be pre-configured. Meanwhile, the following embodiment will be described based on the server which receives lighting control information from the lighting control device and stores the received lighting control information, receives a state notification message from the electronic device, and transmits the lighting control information to the lighting device. The server may be separately provided and the lighting control device may serve as the server.

The server may include a controller and a communication unit. The communication unit may communicate with at least one of the home appliance, the lighting control device, and the lighting device. The controller may control general operations of the server.

Further, according to an embodiment of the present disclosure, the controller of the server may control to configure and store lighting control information. The controller of the server may control to receive a state notification message from the electronic device and to determine a state of the electronic device based on the state notification message.

The controller of the server may store and update the state of the electronic device and the mapping relation with the lighting control information and the lighting device. The controller of the server may control a state of the lighting device by transmitting lighting control information corresponding to a state where a state change of the electronic device is detected to the lighting device based on the mapping relation.

FIG. 17 illustrates a method of connecting and controlling a home appliance and a lighting device according to an embodiment of the present disclosure.

Referring to FIG. 17, the smart home system may include a lighting control device 1710, a server 1720, an electronic device 1730, and a lighting device 1740. Since each entity has been described in FIG. 1, a reference thereof is made through FIG. 1. Meanwhile, it will be described that the smart home system uses the server 1720, the server 1720 may be included in the lighting control device. Further, it is assumed that an application for executing the smart home system may be installed in each entity.

In operation S1701, the lighting control device 1710 may transmit lighting control information to the server 1720. The lighting control information may be the lighting control information described through FIGS. 1 to 16B. A reference for a description of various methods of generating the lighting control information is made through FIGS. 16A and 16B. The server 1720 may store lighting control information.

The server may configure a mapping relation in operation S1703. The mapping relation may include a mapping relation between an electronic device, a lighting device, and lighting control information. Further, the mapping relation may include a mapping relation between a state of the electronic device, the lighting device, and the lighting control information. The mapping relation will be described with reference to FIG. 18.

FIG. 18 illustrates a mapping relation according to an embodiment of the present disclosure. The mapping relation will be described with reference to FIG. 18.

Referring to a table of FIG. 18 which describes the mapping relation, a mapping relation between a state of the electronic device, the lighting control information, and the lighting device is mapped to the table. The table mapping method is an embodiment of the present disclosure, but a mapping method is not limited to the table mapping method. In FIG. 18, the mapping relation between the electronic device and the lighting device is an imperative configuration, and the state of the electronic device and the lighting control information may be additional options for the mapping.

For example, the electronic device may include a washing machine, a refrigerator and the like. States of the electronic devices may different from each other. For example, the washing machine may have a washing state (state 1), a washing completion state (state 2), and an insufficient detergent state (state 3) according to a characteristic of the washing machine. The refrigerator may have an open door state (state 4) and a state (state 5) where refrigerator capacity is 90% or greater according to a characteristic of the refrigerator. Lighting control information for describing each state may be mapped. As described above, the lighting control information may have different on state and off state times, different dimming degrees, and different numbers of repetitions. The same control information may be configured in respective states. Further, a lighting device corresponding to the electronic device or the state of the electronic device may be mapped. For example, in state 1 of the washing machine, control information 1 is transmitted to lighting 1 and thus lighting 1 may operate according to control information 1. The user may recognize the configured state of the electronic device based on lighting in a configured place and a lighting operation pattern.

Referring back to FIG. 17, the operation of FIG. 17 will be described. When the state of the electronic device 1730 is changed, the electronic device 1730 may transmit the state notification message to the server 1720 in operation 1705. The electronic device 1730 may transmit the state notification message whenever the state changes or when the state changes to a set state. Further, the electronic device 1730 may transmit the state notification message for state change information stored in every configured period after storing the state change information.

The server 1720 may identify the state of the electronic device 1730 based on the received state notification message in operation S1707.

The server 1720 may determine whether there is a mapping relation corresponding to state information of the identified electronic device in operation S1709. When there is the mapping relation, lighting control information corresponding to the mapping relation may be transmitted to the lighting device 1740 in operation S1711. The mapping relation may be configured in a plurality of lighting devices. In this case, control information may be transmitted to the plurality of lighting devices.

When there is no mapping relation corresponding to identification information, the server may configure a mapping relation by itself. Further, the server may transmit a message making a request for configuring a mapping relation to the lighting control device 1710 or a user equipment. When the server receives the configuration of the mapping relation from the lighting control device or the user equipment, the server may transmit corresponding lighting control information to the configured lighting device. Meanwhile, when the mapping relation is not configured, the server determines the state as an error and may transmit lighting control information for informing of the error to one or more lighting control devices.

The lighting device 1740 may control on/off, a color, and dimming of lighting based on the received lighting control information in operation S1713. The lighting control device 1740 may additionally transmit feedback information to the server 1720 in operation S1715. For example, when the configured lighting device 1740 cannot perform an operation instructed through the lighting control information, feedback information thereof may be transmitted and the server may modify or update the mapping relation based on the feedback information. Further, the server may inform the user of the feedback information.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. A method of controlling lighting using an electronic device, the method comprising:
receiving pattern information including a line for controlling lighting;
determining a plurality of slope attributes of the line, the plurality of slope attributes including a plurality of slope angles of the line;
determining a plurality of operation switching points based on the plurality of slope attributes of the line;
generating lighting control information based on a time difference and a brightness level difference between operation switching points of the plurality of operation switching points;
operating a lighting device based on the lighting control information;
receiving a continuous pattern for controlling lighting for a predetermined duration;
generating second lighting control information based on the received continuous pattern; and
controlling a dimming level of the lighting device continuously during the predetermined duration based on the second lighting control information,
wherein the determining of the plurality of operation switching points comprises determining operation time information corresponding to at least one slope angle of the plurality of slope angles that is greater than a set threshold.

2. The method of claim 1, wherein the pattern information further includes image information corresponding to a lighting operation time and a lighting brightness level.

3. The method of claim 1, wherein the receiving of the pattern information comprises:
generating a two-dimensional input area including a lighting operation time and a lighting brightness level; and
receiving the line of the pattern information in the generated input area.

4. The method of claim 1, further comprising:
sampling the line of the pattern information in a unit of set time,
wherein the generating of the lighting control information is further based on sampled time information and brightness level at each sample point of the sampled line of the pattern information.

5. The method of claim 1, further comprising outputting error generation information,
wherein the outputting of the error generation information comprises outputting error information when pattern information on a plurality of brightness levels are received at an equal time point.

6. The method of claim 1,
wherein the pattern information further includes sound information, and
wherein the generating of the lighting control information is further based on the sound information.

7. The method of claim 6, further comprising:
identifying sound type information for identifying the sound information; and
determining whether set sound type information is included in the sound information,
wherein the generating of the lighting control information based on the sound information comprises generating the lighting control information based on input interval information of the sound type information included in the sound information.

8. The method of claim 6, wherein the generating of the lighting control information based on the sound information comprises determining brightness level information based on at least one of size information or frequency information of the sound information.

9. The method of claim 1,
wherein the pattern information further includes text information, and
wherein the generating of the lighting control information is further based on the text information.

10. The method of claim 1,
wherein the continuous pattern is received from a two-dimensional input area including a lighting operation time of the lighting device and the dimming level of the lighting device, and
wherein the lighting operation time of the lighting device is determined based on the predetermined duration.

11. The method of claim 1, wherein the controlling of the dimming level of the lighting device is performed in real time corresponding to the receiving of the continuous pattern.

12. An electronic device controlling lighting, the electronic device comprising:
a transceiver configured to transmit or receive pattern information including a line for controlling lighting; and
at least one processor configured to:
determine a plurality of slope attributes of the line, the plurality of slope attributes including a plurality of slope angles of the line,
determine a plurality of operation switching points based on the plurality of slope attributes of the line,
generate lighting control information based on a time difference and a brightness level difference between operation switching points of the plurality of operation switching points,
operate a lighting device based on the lighting control information,
receive a continuous pattern for controlling lighting for a predetermined duration,
generate second lighting control information based on the received continuous pattern, and
control a dimming level of the lighting device continuously during the predetermined duration based on the second lighting control information,
wherein, to determine the plurality of operation switching points, the at least one processor is further configured to determine operation time information corresponding to at least one slope angle of the plurality of slope angles that is greater than a set threshold.

13. The electronic device of claim 12, wherein the pattern information further includes information corresponding to a lighting operation time and a lighting brightness level.

14. The electronic device of claim 12, wherein the at least one processor is further configured to:
generate a two-dimensional input area including a lighting operation time and a lighting brightness level, and
receive the line of the pattern information in the generated input area.

15. The electronic device of claim 12,
wherein the at least one processor is further configured to sample the line of the pattern information in a unit of set time, and
wherein the at least one processor is further configured to generate the lighting control information further based on sampled time information and brightness level at each sample point of the sampled pattern information.

16. The electronic device of claim 12, wherein the at least one processor is further configured to output error information when pattern information on a plurality of brightness levels are received at an equal time point.

17. The electronic device of claim 12,
wherein the pattern information further includes sound information, and
wherein the at least one processor is further configured to generate the lighting control information further based on the sound information.

18. The electronic device of claim 17, wherein the at least one processor is further configured to:
identify sound type information for identifying the sound information, and
determine whether set sound type information is included in the sound information,
wherein, to generate of the lighting control information based on the sound information, the lighting processor is further configured to generate the lighting control information based on input interval information of the sound type information included in the sound information.

19. The electronic device of claim 17, wherein, to generate the lighting control information based on the sound information, the at least one processor is further configured to determine brightness level information based on size information or frequency information of the sound information.

20. The electronic device of claim 12,
wherein the pattern information further includes text information, and
wherein the at least one processor is further configured to generate the lighting control information further based on the text information.

21. The electronic device of claim 12,
wherein the continuous pattern is received from a two-dimensional input area including a lighting operation time of the lighting device and the dimming level of the lighting device, and
wherein the lighting operation time of the lighting device is determined based on the predetermined duration.

22. The electronic device of claim 12, wherein the at least one processor is further configured to control the dimming level of the lighting device in real time corresponding to the receiving of the continuous pattern.

* * * * *